US007482040B2

(12) United States Patent
Gros

(10) Patent No.: US 7,482,040 B2
(45) Date of Patent: Jan. 27, 2009

(54) MIXTURE FOR APPLYING A POLYMERIC CORROSION-PROOF ELECTRICALLY WELDABLE COVERING AND METHOD FOR PRODUCING THIS COVERING

(75) Inventor: Georg Gros, Oppenau (DE)

(73) Assignee: Chemetall GmbH, Frankfurt (DE)

( * ) Notice: Subject to any disclaimer, the term of this patent is extended or adjusted under 35 U.S.C. 154(b) by 551 days.

(21) Appl. No.: 10/511,222

(22) PCT Filed: Apr. 17, 2003

(86) PCT No.: PCT/EP03/04056

§ 371 (c)(1), (2), (4) Date: May 23, 2005

(87) PCT Pub. No.: WO03/089530

PCT Pub. Date: Oct. 30, 2003

(65) Prior Publication Data

US 2006/0011893 A1 Jan. 19, 2006

(30) Foreign Application Priority Data

Apr. 20, 2002 (DE) ............... 102 17 624
Oct. 12, 2002 (DE) ............... 102 47 691
Dec. 3, 2002 (DE) ............... 102 56 286

(51) Int. Cl.
*B05D 5/12* (2006.01)
(52) U.S. Cl. ............... 427/384; 427/385.5; 427/388.1; 427/388.2; 427/388.4; 427/388.5
(58) Field of Classification Search ............... 427/384, 427/385.5, 388.1–388.5
See application file for complete search history.

(56) References Cited

U.S. PATENT DOCUMENTS

| 3,175,991 A | 3/1965 | Morris et al. |
| 3,562,124 A | 2/1971 | Leon et al. |
| 3,849,141 A | 11/1974 | Palm et al. |
| 3,884,705 A | 5/1975 | Blair |
| 3,990,437 A | 11/1976 | Boyden et al. |
| 4,070,323 A | 1/1978 | Vanderhoff et al. |
| 4,139,385 A | 2/1979 | Crivello |
| 4,213,837 A | 7/1980 | Bristowe et al. |
| 4,228,438 A | 10/1980 | Vazirani |
| 4,626,283 A | 12/1986 | Martins et al. |
| 4,628,004 A | 12/1986 | Nickola et al. |
| 4,724,172 A | 2/1988 | Mosser et al. |
| 4,851,460 A | 7/1989 | Stranghoner et al. |
| 4,876,160 A | 10/1989 | Chindou et al. |
| 4,889,773 A | 12/1989 | Campbell et al. |
| 4,896,250 A | 1/1990 | Sullivan |
| 4,939,034 A | 7/1990 | Sobata et al. |
| 4,981,759 A | 1/1991 | Nakatani et al. |
| 4,996,085 A | 2/1991 | Sievers |
| 5,001,173 A * | 3/1991 | Anderson et al. ............ 523/406 |
| 5,069,966 A | 12/1991 | Colaiacovo et al. |
| 5,073,585 A | 12/1991 | Basf |
| 5,126,768 A | 6/1992 | Nozawa et al. |
| RE34,116 E | 10/1992 | Shindou et al. |
| 5,260,120 A | 11/1993 | Moyle et al. |
| 5,336,303 A | 8/1994 | Cocks |
| 5,501,942 A | 3/1996 | Salvin et al. |
| 5,532,025 A | 7/1996 | Silverman et al. |
| 5,578,669 A | 11/1996 | Odawa et al. |
| 5,594,065 A | 1/1997 | Tien et al. |
| 5,712,034 A | 1/1998 | Stevens et al. |
| 5,750,249 A | 5/1998 | Walther et al. |
| 5,753,740 A | 5/1998 | Odawa et al. |
| 5,834,128 A | 11/1998 | Hamahara et al. |
| 5,853,890 A | 12/1998 | Odawa et al. |
| 5,855,820 A | 1/1999 | Chan et al. |
| 5,922,119 A | 7/1999 | Gijsbert |
| 5,976,419 A | 11/1999 | Hawkins et al. |
| 6,001,469 A | 12/1999 | Verardi et al. |
| 6,008,462 A | 12/1999 | Soltwedel |
| 6,054,514 A | 4/2000 | Kulkarni |
| 6,146,706 A | 11/2000 | Verardi et al. |
| 6,156,416 A | 12/2000 | Daems et al. |
| 6,211,262 B1 | 4/2001 | Mejiritski et al. |
| 6,284,817 B1 | 9/2001 | Bennington et al. |
| 6,332,291 B1 | 12/2001 | Flosbach et al. |
| 6,472,026 B1 | 10/2002 | Maag et al. |

(Continued)

FOREIGN PATENT DOCUMENTS

AU 742771 5/1999

(Continued)

OTHER PUBLICATIONS

U.S. Appl. No. 10/467,927, filed Oct. 30, 2003, Gros et al.

(Continued)

*Primary Examiner*—Erma Cameron
(74) *Attorney, Agent, or Firm*—Fulbright & Jaworski L.L.P.

(57) ABSTRACT

The invention relates to an enamel-like mixture containing resin and inorganic particles for applying a polymeric, corrosion-proof, wear-resistant, deformable and electrically conductive covering to a substrate. Said mixture contains at least 10 wt. % of electrically conductive particles having an electrical conductivity better than that of zinc particles and having a Moh's hardness greater than 4 with regard to the solids contents of the mixture. These electrically conductive particles have a particle size distribution in which 3 to 22 vol. % of the electrically conductive particles, measured with a Mastersizer 2000 equipped with measuring head Hydro 2000S of the company Malvern Instruments, are, in a volume representation, larger than the average layer thickness of the dried and, optionally, also hardened covering determined on recordings made using a scanning electron microscope. The invention also relates to a method for producing a corrosion-proof, viscoelastic, wear-resistant, deformable and electrically conductive covering, which contains polymers and inorganic polymers, on a substrate and to corresponding coverings applied to a substrate.

41 Claims, No Drawings

U.S. PATENT DOCUMENTS

| | | |
|---|---|---|
| 6,605,669 B2 | 8/2003 | Awokola et al. |
| 6,620,308 B2 | 9/2003 | Gilbert |
| 6,715,196 B2 * | 4/2004 | Reising et al. ............... 29/458 |
| 6,716,891 B1 | 4/2004 | Meisenburg et al. |
| 6,740,365 B2 | 5/2004 | Awokola et al. |
| 6,747,088 B1 | 6/2004 | Schwalm et al. |
| 6,794,422 B1 | 9/2004 | Bruchmann et al. |
| 6,835,459 B2 | 12/2004 | Lorenz et al. |
| 6,855,403 B2 | 2/2005 | Tysak |
| 7,022,175 B2 | 4/2006 | Marten |
| 7,118,690 B2 | 10/2006 | Wessling et al. |
| 7,312,255 B2 | 12/2007 | Gros |
| 2002/0088373 A1 | 7/2002 | Marten |
| 2003/0143078 A1 | 7/2003 | Benedetto et al. |
| 2003/0175541 A1 | 9/2003 | Lorenz et al. |
| 2004/0013815 A1 | 1/2004 | Gros |
| 2005/0017221 A1 | 1/2005 | Marten |
| 2005/0161641 A1 | 7/2005 | Gros |
| 2005/0186442 A1 | 8/2005 | Gros |
| 2006/0011893 A1 | 1/2006 | Gros et al. |
| 2006/0058423 A1 | 3/2006 | Gros et al. |

FOREIGN PATENT DOCUMENTS

| | | |
|---|---|---|
| CA | 2305563 | 8/2000 |
| DE | 26 10 437 | 9/1976 |
| DE | 34 12 234 A1 | 10/1985 |
| DE | 37 27 112 A1 | 2/1989 |
| DE | 196 18 435 C1 | 5/1997 |
| DE | 197 48 764 A1 | 5/1999 |
| DE | 197 48 764 A4 | 5/1999 |
| DE | 198 18 735 A1 | 10/1999 |
| DE | 199 47 522 A1 | 4/2001 |
| DE | 199 51 133 A1 | 4/2001 |
| DE | 199 51 133 A3 | 4/2001 |
| DE | 100 22 075 A1 | 11/2001 |
| DE | 100 22 075 A2 | 11/2001 |
| DE | 100 58 018 A1 | 5/2002 |
| DE | 100 58 018 A3 | 5/2002 |
| DE | 100 58 118 A | 5/2002 |
| EP | 0 081 323 | 6/1983 |
| EP | 0 104 838 A2 | 4/1984 |
| EP | 0 309 286 | 3/1988 |
| EP | 0 298 409 B1 | 1/1989 |
| EP | 0 328 047 | 8/1989 |
| EP | 0 344 129 B1 | 11/1989 |
| EP | 0 545 605 A | 6/1993 |
| EP | 0 659 855 A2 | 6/1995 |
| EP | 0 742 239 A1 | 11/1996 |
| EP | 0 761 320 B1 | 3/1997 |
| GB | 2 040 977 | 9/1980 |
| JP | 50-45740 | 4/1975 |
| JP | 57-192405 | 11/1982 |
| JP | 10-249357 | 9/1998 |
| WO | WO 89/05476 | 5/1989 |
| WO | WO 96/29372 | 9/1996 |
| WO | WO 97/35937 | 10/1997 |
| WO | SO 98/51746 | 11/1998 |
| WO | WO 98/51746 | 11/1998 |
| WO | WO 99/24545 | 5/1999 |
| WO | WO 99/26728 A2 | 6/1999 |
| WO | WO 00/73395 A1 | 12/2000 |
| WO | WO 01/23453 | 4/2001 |
| WO | WO-01/30923 A2 | 5/2001 |
| WO | WO 02/42352 A2 | 5/2002 |

OTHER PUBLICATIONS

U.S. Appl. No. 09/980,182, filed Jan. 7, 2002, Gros et al.
U.S. Appl. No. 10/511,223, Gros et al.
U.S. Appl. No. 10/511,242, filed Oct. 13, 2004, Gros et al.
Schaeffer "Radiation curable oligomers combining superior wear properties with enhanced chemical and moisture resistance", Sartomer Company, Inc. (Jul. 2005).
Schaeffer "Radiation curable oligomers combining superior wear properties with enhanced chemical and moisture resistance", Sartomer Company, Inc. (Jul. 2005).

* cited by examiner

MIXTURE FOR APPLYING A POLYMERIC CORROSION-PROOF ELECTRICALLY WELDABLE COVERING AND METHOD FOR PRODUCING THIS COVERING

The present invention relates to a mixture for applying a polymeric, corrosion-resistant, electrically conductive and in this context readily electrically weldable coating which can be shaped in a low-abrasive manner to a substrate, in particular a metallic substrate, such as e.g. a steel sheet, which has optionally been coated beforehand with zinc or a zinc-containing alloy and then optionally coated with a pretreatment. The coating is to serve, in particular, as a welding primer.

In mass production, welding primers of the 1st generation which, for reasons of corrosion protection, contain chromium are currently employed in automobile construction because to date it is very difficult to employ equivalent and at the same time environment-friendlier constituents instead of chromium-containing compounds in corrosion protection. The electrical conductivity of the polymeric coatings, which are about 2.5 to 9 μm thick, which is necessary for electrical welding is acquired by a very high content of pulverulent metallic zinc embedded in a polymeric matrix. However, because of moisture in any polymeric coating, metallic zinc tends to oxidize rapidly, with formation of white efflorescences (white rust). By the oxidation of the zinc powder, however, the corrosion-protective action and the electrical conductivity of the metallic zinc can be gradually used up with progressive formation of white rust. In addition, only certain requirements in respect of electrical weldability are imposed on the welding primers of the first generation of limited corrosion resistance. It is sufficient if 600 welding points can be set by a welding machine through two steel sheets about 0.5 to 2.0 mm thick which are lying on one another and are coated on both sides before the welding electrodes have to be reworked or replaced. The structure of the coatings on the steel sheets in this context typically comprises first a layer of zinc or a zinc alloy about 2 to 7.5 μm thick, a pretreatment layer about 0.01 to 1.0 μm thick on top of this and finally a welding primer layer of a thickness significantly below 10 μm thick. With in each case three different coatings applied on one another and in each case double-sided, there are therefore in total 2 sheets with 12 layers to be through-plated for each welding point.

However, far higher requirements are imposed on welding primer coatings of the 2nd generation for use in automobile construction: 1.) The corrosion resistance of a flange of two metal sheets should be higher by a factor of about three, in spite of the absence of chromium, since here it is required that an extremely aggressive corrosion protection alternating test in accordance with VDA 621-415 with 20, instead of only 10, cycles each of a duration of one week with salt spray tests, condensation water tests and recondensation is passed successfully without the appearance of red rust. Over the test duration of 20 weeks, the test has a progressively more severe effect. 2.) During electrical welding, the number of welding points which can be achieved with a welding machine for electrical resistance spot welding should accordingly be at least 1,200, instead of only 600, before the welding electrodes are replaced or reworked. 3.) For gluing, which is used instead of welding to an ever increasing degree in automobile construction, it is necessary for the requirements of adhesive strength between the substrate and the zinc-containing coating, between the zinc-containing coating and the pretreatment layer, between the pretreatment layer and the welding primer layer and between the welding primer layer and the adhesive layer also to be at least as high as in the case of the 1st generation welding primers, the 1st generation welding primers often being applied more thinly (2.5 to 3 μm, but then free from electrically conductive hard particles) than the foreseeable 2nd generation welding primers because of the high corrosion requirements, and the adhesive strength requirements also increasing with the layer thickness since the adhesive strength also in general decreases significantly with the dry film thickness. 4.) Furthermore, it would be advantageous if the welding primers were to prove to be outstanding also with other types of welding instead of resistance welding, since the use of alternative welding technology is also being worked on intensively. It is hoped that by this means the labour-intensive and expensive sealing of hollow cavities and, where appropriate, also the sealing of seams can also be dispensed with using the 2nd generation welding primers.

It is moreover necessary that metal sheets which are coated with welding primer and are processed in automobile construction can be shaped without problems. A bordering, beading, deep-drawing or/and pressing in large presses in a low-abrasive manner in which the corresponding tool is not worked off too severely and too rapidly and the welding primer coating is not destroyed, eroded, torn off or seriously damaged is necessary in particular here. This applies in particular to the inorganic contents in the welding primer which are bonded into an organic matrix.

The publications of the prior art on electrically conductive optionally electrically weldable coatings which comprise at least one resin often describe the use of graphite, carbon black, aluminium, nickel, zinc or/and ferro-alloys, such as e.g. iron phosphides based on mixtures of FeP, $Fe_2P$ and evidently unavoidable impurities. The iron phosphides are conventionally based on Ferrophos® powders from Occidental Chemical Corp. (=OxyChem, formerly Hooker Chem. and Plastics Corp.), of which the grades HRS 2132 and HRS 3095 have an average particle size of 3.3 μm and 2.8 μm respectively, according to the manufacturer, but comprise a considerable content of over-sized particles, which can be seen from the particle size transfer value $d_{99}$ of 16 μm and 12 μm respectively. However, at a particle size value $d_{99}$ measured with a Mastersizer 2000 with a Hydro 2000S measuring head from Malvern Instruments, in a volume plot this over-sized particle content makes up even about 32 μm or about 24 μm, the upper end of the particle size distributions $d_{100}$ even being at about 39 μm or about 34 μm. All of the publications known to the Applicant which mention iron phosphide as an additive for coating mixtures are based on these Ferrophos® powders. These powder grades are evidently employed in the non-ground form in all these publications, since grinding operations are at best carried out in a mixture of at least three components, mixing with one another often being of primary importance, but the particle sizes are to be scarcely reduced, if at all. As is known, the grinding operations for the preparation of lacquers and similar coatings are often only mixing processes or grinding operations of comparatively low intensity, since they are usually carried out in an organic suspension with a comparatively low iron phosphide content. Since iron phosphides are hard and brittle, they require vigorous grinding without the presence of any or in the presence of as small an amount as possible of substances which impair the grinding action. Furthermore, grinding of finely divided phosphides is not without risk.

The doctrine of U.S. Pat. No. 6,008,462 is liquid coating compositions for weldable primers which are resistant to sea water and have a content of metallic iron particles. The introduction to the description of this patent specification describes problems which occur when using iron phosphides in primer coatings and which are also mentioned similarly in U.S. Pat. No. 5,260,120. These include the exceptionally abrasive action of the iron phosphide particles on tools and the high coefficient of friction of such coatings. In these publications, these problems are solved by employing iron particles instead of iron phosphide particles in the primer coating or by additionally applying a thin polymeric topcoat to the coating comprising iron phosphide particles, which is said not to impair too severely the weldability of metal sheets coated in this way.

U.S. Pat. No. 4,889,773 describes electrodes for resistance welding which have a coating of binder and at least one phosphide, preferably based on iron phosphides. This coating is not aimed at the high requirements of welding primer coatings.

The doctrine of U.S. Pat. No. 4,110,117 is coating compositions comprising zinc, aliphatic polyol silicates and in some cases also iron phosphide.

U.S. Pat. No. 4,011,088 protects purely inorganic coatings based on particles of iron phosphide or/and nickel phosphide which are embedded in a water-soluble silicate binder.

The doctrine of U.S. Pat. No. 3,884,705 is coatings which, in addition to so-called ferro-alloys, such as iron phosphide alloys, comprise increased contents of corrosion protection pigments and optionally also zinc dust.

WO 96/29372 relates to compositions which, in addition to binder resin, comprise zinc, graphite and optionally further components, such as e.g. iron phosphide.

In scanning electron microscopy analysis of welding primer coatings on metallic substrates on which the welding primer coating is to have a dry film thickness of less than 9 μm, it is striking that over-sized iron phosphide particles not only lead to a coating which appears inhomogeneous, but also form troublesome peaks which project out of the coating and give rise to severe abrasion during shaping. Initial shaping experiments using iron phosphide powder grades added in the non-ground form showed a considerable abrasion and a lack of suitability for shaping in series production.

The parallel patent applications DE 102 17 624 and DE 102 48 799 are explicitly included in respect of their information on the various particles and properties and contents thereof and on the coatings and their properties.

There was therefore the object of proposing coatings which are suitable for shaping, e.g. of steel sheets such as are processed, for example, in the automobile industry, in a low-abrasive manner in series production. In spite of the coating on one or even both sides, e.g. 1.) with zinc or a zinc-containing alloy, 2.) with a thin pretreatment layer which is a corrosion protection and an adhesive base for the subsequent primer, and 3.) with a 0.5 to 10 μm thick welding primer coating, these coatings should be sufficiently electrically conductive to be readily weldable. The process for producing the welding primer coating should moreover be as simple as possible, suitable for series production and inexpensive.

The object is achieved with a lacquer-like mixture comprising resin and inorganic particles for applying a polymeric, corrosion-resistant, electrically conductive and electrically weldable coating which can be shaped in a low-abrasive manner to a substrate, in particular to a metallic substrate such as e.g. a steel sheet, it being possible for the substrate optionally to be precoated on at least one side of the substrate, e.g. with at least one zinc layer or/and a zinc-containing alloy layer or/and with at least one pretreatment layer, wherein the mixture comprises at least 10 wt. % of electrically conductive particles having an electrical conductivity better than that of particles of pure zinc and having a Mohs hardness of greater than 4, based on the solids contents of the mixture, and wherein these electrically conductive particles have a particle size distribution in which 3 to 22 vol. % of the electrically conductive particles, measured with a Mastersizer 2000 with a Hydro 2000S measuring head from Malvern Instruments, in a volume plot are larger than the average layer thickness of the dried and optionally also cured coating, determined on scanning electron microscopy photographs.

The object is furthermore achieved with a lacquer-like mixture comprising resin and inorganic particles for applying a polymeric, corrosion-resistant, electrically conductive and electrically weldable coating which can be shaped in a low-abrasive manner to a substrate, in particular to a metallic substrate such as e.g. a steel sheet, it being possible for the substrate optionally to be precoated on at least one side of the substrate, e.g. with at least one zinc layer or/and a zinc-containing alloy layer or/and with at least one pretreatment layer, wherein the mixture comprises at least 10 wt. % of electrically conductive particles having an electrical conductivity better than that of particles of pure zinc and having a Mohs hardness of greater than 4, based on the solids contents of the mixture, and wherein the envelope curve of the particle size distribution for these electrically conductive particles, measured with a Mastersizer 2000 with a Hydro 2000S measuring head from Malvern Instruments, in a logarithmic plot of the volume has at least two peaks and is divided into individual Gauβ distribution curves, a first minimum of the individual Gauβ distribution curves between the main peak and the next larger peak of these distribution curves, determined in μm, being greater by a factor of 0.9 to 1.8 than the average dry film thickness of the dried and optionally also cured coating, determined on scanning electron microscopy photographs, but not more than 22 vol. % of the particle size distribution of these electrically conductive particles being larger than the average dry film thickness.

The subject matter of the patent applications DE 102 47 624 and DE 102 47 691 is expressly included in this application in respect of the information on the examples, comparison examples, testing techniques, particle-related data, such as e.g. nature, size, size distributions and properties, and on the properties and compositions of the mixtures and coatings and on the coatings and process steps.

The mixture can be, in particular, a composition for applying a polymeric, corrosion-resistant, electrically conductive coating which can be shaped in a low-abrasive manner to a substrate.

The mixture according to the invention can preferably comprise 20 to 80 wt. % of electrically conductive particles having an electrical conductivity better than that of particles of pure zinc and having a Mohs hardness of greater than 4, based on the solids contents of the mixture, particularly preferably at least 25, at least 32 or at least 38 wt. % and not more than 68, not more than 58 or not more than 48 wt. %.

In the mixture according to the invention, the electrically conductive particles can have a particle size distribution in which, in particular, at least 5 vol. %, preferably at least 7 or 9 vol. % and preferably not more than 19 or 17 or 15 or 13 vol. % are larger than the average layer thickness of the dried and optionally also cured coating. The electrically conductive particles can preferably have an electrical conductivity or an electrical resistance which is better than that of polycrystalline industrially pure zinc by at least one, by at least two or by at least three powers of ten, where appropriate measured as the electrical resistance and on the basis of an electrical resistance of polycrystalline industrially pure zinc of about $6 \cdot 10^{-6}$ $\Omega/cm^3$. The Mohs hardness of the electrically conductive particles can be at least 5, at least 5.5, at least 6 or at least 6.5 at least in some of these particles.

The minimum between the main peak and the next larger peak of the individual Gauβ distribution curves under the envelope curve (=particle distribution curve measured), which should not be infinitesimally small compared with the main peak, can be in particular greater by a factor of 1 to 1.7 than the average dry film thickness of the dried and optionally also cured coating, preferably by a factor of 1.1 to 1.6, particularly preferably by a factor of at least 1.2 and not more than 1.5. If the main peak under the envelope curve is slightly twin-peaked, the individual maxima of which are not further than 2.5 μm apart, and if all the following peaks are significantly smaller, the twin-peaked main peak is regarded as a single main peak.

In particular, at least 5 vol. % of the electrically conductive particles are larger than the average layer thickness of the dried and optionally also cured coating, preferably at least 7 or at least 9 vol. % and preferably not more than 19, not more than 17, not more than 15 and not more than 13 vol. %.

The substrate can be, in particular, one of steel, of high-grade steel, of at least one aluminium or/and magnesium alloy. Sheets, plates, rods or parts of complicated shape or already joined components are preferred. Strip, plates or sheets in particular of an aluminium alloy or of a steel are preferred.

Preferably, the particle size distribution of the remaining inorganic particles, i.e. of all the inorganic particles without the electrically conductive particles, measured with a Mastersizer 2000 with a Hydro 2000S measuring head from Malvern Instruments, can have a higher volume content of the largest particles at the particle volume transfer value $d_{98}$ or in the Gauβ distribution curve with the largest particle volumes than the particle volume transfer value $d_{98}$ or the corresponding Gauβ distribution curve of the electrically conductive particles.

The mixture according to the invention advantageously comprises no electrically conductive particles having a particle size diameter greater than five times the value of the average dry film thickness of the dried and optionally also cured coating, particularly preferably not more than 4.5 times, four times, 3.5 times or three times the value.

The coating according to the invention can be applied to the substrate to any desired extent, e.g. to only one or to both sides, e.g. of a metal sheet, optionally including at least one edge or only in a certain width or in a certain pattern, so that e.g. edge regions thereby can remain uncoated.

In a similar manner, the zinc-containing metallic precoatings and the pretreatment precoatings can also be applied, in each case in approximately the same or a different manner.

The electrically conductive particles are conventionally water-insoluble or sparingly water-soluble. They serve, under certain circumstances, as barrier particles, without themselves having to be particularly corrosion-resistant. Nevertheless, it is preferable for the electrically conductive particles to be somewhat more stable to chemicals or/and more corrosion-resistant, in particular to water and weakly basic media.

The electrically conductive particles are chosen in particular from those based on alloys, boride, carbide, oxide, phosphide, phosphate, silicate or/and silicide. They are preferably such compounds and alloys based on aluminium, chromium, iron, calcium, magnesium, manganese, nickel, cobalt, copper, lanthanum, lanthanide, molybdenum, niobium, tantalum, titanium, vanadium, tungsten, yttrium, zinc, tin or/and zirconium. Their electrical conductivity can optionally be substantially based on at least one particular doping addition or/and content of at least one further phase of better electrical conductivity or/and of at least one coating of better electrical conductivity. Particularly preferred substances are iron phosphate, manganese phosphate, nickel phosphate, zinc phosphate or/and further phosphates based on aluminium, iron, copper, manganese, nickel, zinc or/and further transition metals, phosphides based on iron, manganese, molybdenum, nickel, titanium, zirconium or/and optionally further transition metals, borides based on titanium or/and other transition metals, carbides of elevated electrical conductivity, such as e.g. silicon carbide of particularly high electrical conductivity, or silicides, such as e.g. based on molybdenum, vanadium carbide, titanium nitride or/and other transition metals.

Compounds which are particularly preferred here are oxides of high electrical conductivity, in particular oxides having a structural chemistry based on at least one spinel, such as e.g. $Fe_3O_4$ or $(Cu, Fe, Mn, Ni, Ti, Zn)_3O_4$, based on at least one oxide having a below-stoichiometric oxygen content and of comparatively high electrical conductivity, such as e.g. $SnO_{2-x}$ or $TiO_{2-x}$, where x is e.g. in the range from 0.02 to 0.25, or based on at least one phosphide which, in particular, can be attacked to only a small degree or cannot be attacked by water and dilute acids and has a relatively high electrical conductivity.

In the mixture according to the invention, the electrically conductive particles can comprise substances based on compounds or mixtures of compounds with or of spinels, such as e.g. $Fe_3O_4$, $Mn_3O_4$, $FeMn_2O_4$ or/and further substances based on borides, carbides, oxides, phosphates, phosphides, silicates, silicides or particles having an electrically conductive coating or/and a mixture thereof or a common compound thereof, and optionally further metallic particles chosen from aluminium-, iron-, cobalt-, copper-, molybdenum-, nickel-, niobium-, silver-, tantalum-, titanium-, vanadium-, tungsten-, zinc- or/and tin-containing alloys, in particular oxides substantially based on spinels, preferably of aluminium, chromium, iron, cobalt, copper, magnesium, manganese, nickel, vanadium, titanium or/and zinc or/and substantially based on electrically conductive oxides having a below-stoichiometric oxygen content, such as e.g. $TiO_{1.95}$, or/and in particular phosphides substantially based on aluminium, iron, cobalt, copper, manganese, molybdenum, nickel, niobium, tantalum, titanium, vanadium, tungsten, zinc or/and tin, in particular based on phosphides, preferably based on iron-, manganese-, nickel- or/and tin-containing phosphides. Particles having an electrically conductive coating which are suitable in particular are those which have an electrical conductivity of at least that of metallic zinc, in particular particles coated with graphite, carbon black, another type of carbon, electrically conductive metal, iron oxide, antimony compound(s) or/and tin compound(s).

In the mixture according to the invention, preferably at least 30 wt. %, preferably at least 45 wt. %, particularly preferably at least 60 wt. %, in particular at least 75 wt. %, above all at least 90 wt. % of the electrically conductive particles can be oxides or/and phosphides substantially based on aluminium, iron, cobalt, copper, manganese, molybdenum, nickel, niobium, tantalum, titanium, vanadium, tungsten, zinc or/and tin, including oxides having a below-stoichiometric oxygen content and having an elevated electrical conductivity, in particular oxides or/and phosphides based on iron-, manganese-, nickel- or/and zinc-containing compounds or mixtures thereof.

Preferably, the content of the electrically conductive particles based on boride, carbide, phosphate, silicate and silicide is not more than 60 wt. % of all the electrically conductive particles, particularly preferably not more than 45 wt. %, very particularly preferably not more than 30 wt. %, in particular not more than 15 wt. %. However, it may be preferable to adjust the content of iron oxide pigment, in particular such as is known in the lacquer industry, to contents of up to 20 wt. %, particularly preferably to up to 10 wt. %, very particularly preferably to up to 5 wt. %, in particular to no such pigment content at all.

All particle size determinations from an average particle size of 0.3 μm are based on distributions measured with a Mastersizer 2000 with a Hydro 2000S measuring head from Malvern Instruments. The suspension with the particles to be measured was prepared here in accordance with the information in the examples and comparison examples. For determinations below an average size of 0.3 μm, measurements or evaluations from photographs which have been obtained with a scanning electron microscope on particles well-distributed on a support are preferably to be used. In the case of larger accumulations recognizable as agglomerates, the particles should be counted here separately as many individual particles and not as individual agglomerates and at least 400 particles should be taken into account in order to be able to determine approximate distributions.

Preferably, the transfer value $d_{80}$ of the electrically conductive particles in the volume plot is not more than 8 μm, particularly preferably not more than 7 μm, very particularly preferably not more than 6 μm, above all not more than 5 μm. The transfer value $d_{90}$ of the electrically conductive particles is advantageously in the range from 0.5 to 6.5 μm, particularly preferably in the range from at least 1.5 μm and up to 5.5 μm, very particularly preferably in the range from at least 2.0 μm and up to 4.5 μm, above all in the range from at least 2.5 μm and up to 4.0 μm.

In the mixture according to the invention, the mixture of all the types of electrically conductive particles can have, in particular, an average particle size $d_{50}$ in the volume plot of not more than 3.6 μm or not more than 3.2 μm or/and in the range from 0.1 to 3 μm, very particularly in the range from 0.2 to 2.8 μm. Preferably, it is in a range up to 1.8 μm, particularly preferably in a range up to 2.6 μm, very particularly preferably in a range up to 2.4 μm and preferably in a range from at least 0.5 μm.

The size of the electrically conductive particles, based on the transfer value $d_{10}$ in the volume plot, is advantageously not more than 1.5 μm, in particular not more than 1.2 μm, very particularly preferably not more than 0.8 μm.

In the mixture according to the invention, the mixture of all the types of electrically conductive particles can preferably have a steep particle size distribution in which the transfer value $d_{99}$ to the transfer value $d_{10}$ in the volume plot is at most a factor of 12. This factor is in particular at most the factor 11, particularly preferably at most 10, very particularly preferably at most 9, above all at most 8.

In the process according to the invention, the electrically conductive particles are preferably ground alone by themselves. Grinding can be carried out here separately for each particle type of the electrically conductive particles or in part mixtures or in a total mixture of all the types of electrically conductive particles. In the process according to the invention, the over-sized particles can predominantly be comminuted during grinding of the electrically conductive particles, so that a narrower particle size distribution arises. A steep particle size distribution of these powders which make up a high content of the pigmentation contributes substantially to a uniform particle distribution within the finished coating. It is particularly advantageous if a narrower particle size distribution is established by the grinding of the electrically conductive particles, especially if the very fine particles are scarcely comminuted or if the powder is not ground to dust by this means. It is particularly preferable to adjust the particle size distribution to a narrower distribution by grinding only for the particle types of the electrically conductive particles of which the average particle size is greater than 1 μm, very particularly preferably greater than 2 μm. If a mixture of various electrically conductive particles should be present, it may be of interest to grind either only the mixture or/and the individual particle grades separately. Grinding of these particles or this particle mixture is preferably particularly intensive, in particular using specific grinding units. It may be of interest here to choose a grinding unit which is not normally employed in the lacquer industry because in the lacquer industry usually only relatively low-intensity grinding is carried out, that is to say conventionally only a mixture of soft or/and hard substances or a mixture of polymeric or/and inorganic substances, which are not necessarily in particle form, is ground and the grinding conditions for hard particles for this reason alone are of relatively low intensity.

If more than in each case one powder grade per pigment category should be present, in particular in the case of the electrically conductive particles or in the case of other pigment categories, the individual powder grade preferably has an average particle size which is approximately of the order of size of the average particle size $d_{50}$ in the volume plot of the electrically conductive particles or of all types of the electrically conductive particles ($d_{50}\pm 1$ μm) or slightly lower (down to $d_{50}-1$ μm). The corrosion protection pigment of at least one optionally present preferably has an average particle size which is also approximately of the size of the average particle size $d_{50}$ of the electrically conductive particles ($d_{50}\pm 1$ μm) or slightly below (down to $d_{50}-1$ μm). These properties can also contribute substantially to establishing a uniform particle distribution within the finished coating.

In the mixture according to the invention, preferably, the content of electrically conductive particles in the mixture can be 12 to 80 wt. % or/and the content in the mixture of very soft or soft particles which are capable of sliding can be 0.1 to 30 wt. %, in each case based on the weight of the solid in the wet lacquer (all solids=100 wt. %). Preferably, the content of electrically conductive particles here is at least 15 wt. % and not more than 70 wt. %, based on the weight of the solid in the wet lacquer, particularly preferably at least 18 wt. % and not more than 65 wt. %, very particularly preferably at least 24 wt. % and not more than 60 wt. %. At a high content of electrically conductive particles in the mixture, a harder, stronger, more electrically conductive and usually also more chemically stable coating is achieved, while with a low content of electrically conductive particles in the mixture a softer, less strong, under certain circumstances less electrically conductive coating is rather achieved.

Preferably, the content of very soft or soft particles which are capable of sliding, if present at all, in this context is at least 0.2 wt. % and not more than 30 wt. %, based on the weight of the solid in the wet lacquer, particularly preferably at least 0.3 wt. % and not more than 24 wt. %, very particularly preferably at least 0.5 wt. % and not more than 18 wt. %. Preferably, the content of sulfides, selenides and tellurides in the mixture is not more than 5 wt. % and particularly preferably not more than 3.5 wt. %, very particularly preferably not more than 2.5 wt. %, based on the weight of the solid in the wet lacquer. If these substances should be less corrosion-resistant, their content should not be too high. At a high content in the mixture of very soft or soft particles which are capable of sliding, a flexible, softer coating which is very readily capable of sliding is formed, while with a particularly low content in the mixture of very soft or soft particles which are capable of sliding a harder, stronger coating which usually has a better electrical conductivity is established.

The very soft or soft particles which are capable of sliding are preferably those having very good friction properties. They are water-insoluble or sparingly water-soluble. They preferably contain particles having a substantially flat (platelet) or longitudinal extent (needles, straight-edged particles) or/and substantially corresponding aggregates. In particular, those based on graphite or/and chalcogenide, such as sulfide, selenide or telluride, in particular on graphite, antimony-containing, manganese-containing, molybdenum-containing, bismuth-containing, tungsten-containing or/and tin-containing chalcogenide, above all on manganese sulfide, molybdenum disulfide, tungsten disulfide or/and tin sulfide are preferred. They can also be coated e.g. with carbon or graphite. In the mixture according to the invention, they can be predominantly or entirely of graphite, sulfide, selenide or/and telluride, in particular of graphite, antimony-containing sulfide, tin-containing sulfide, molybdenum sulfide or/and tungsten sulfide.

In the mixture according to the invention, the mixture of all the types of very soft or soft particles which are capable of sliding can have, on addition to the mixture, a particle size transfer value $d_{99}$ in a range from 2 to 36 µm, in particular in a range from at least 6 µm and up to 32 µm, preferably in a range up to 28 µm, particularly preferably in a range up to 24 µm, preferably in a range from at least 10 µm, particularly preferably in a range from at least 14 µm. Preferably, the transfer value $d_{99}$ of the very soft or soft particles is significantly higher than the transfer value $d_{99}$ of the electrically conductive particles, in particular higher by a factor of 1.2 to 10, preferably by a factor of 1.5 to 8, particularly preferably by a factor of 2 to 7. The electrically conductive particles often show out of the coating to a certain amount if they have not been subjected to relatively severe mechanical stresses up until application of the coating, and can be comminuted rapidly during mechanical stress on the coating, such as e.g. during rubbing or shaping, these particles helping as lubricants by themselves alone or in combination with any contents of oil present, such as e.g. deep-drawing oil.

In the mixture according to the invention, the mixture of all the types of very soft or soft particles which are capable of sliding can have, on addition to the mixture, an average particle size $d_{50}$ in the range from 0.1 to 20 µm, preferably in a range up to 18 µm, particularly preferably in a range up to 15 µm, very particularly preferably in a range up to 12 µm and preferably in a range from at least 1 µm, particularly preferably in a range from at least 3 µm, very particularly preferably in a range from at least 5 µm. Platelets are the preferred particle shape of the very soft or soft particles which are capable of sliding. In the mixture according to the invention, the average particle size $d_{50}$ of the very soft or soft particles which are capable of sliding can be, on addition to the mixture, greater by a factor of 1.5 to 7 than the average particle size $d_{50}$ of the electrically conductive particles, preferably greater by a factor of 2 to 6, particularly preferably greater by a factor of 3 to 5.

A content of particles of at least one zinc-rich alloy, in particular one having a significantly higher corrosion resistance than industrially pure zinc, such as e.g. having a content of Al, Mg or/and other alloy constituents, is also particularly preferred.

The mixture can furthermore optionally also comprise other particles which belong neither to the electrically conductive particles, nor to the very soft or soft particles which are capable of sliding, nor to the corrosion protection pigments. They can be, for example, metallic particles, alloy particles or oxide particles having a low electrical conductivity, semiconducting or electrically insulating properties. Preferably, 0.5 to 15 wt. % of at least one corrosion protection pigment, based on the solids contents of the mixture, is present.

Advantageously, no or no large amounts ($\leq 12$ wt. %) of particles of metals or/and alloys or/and optionally also of carbon black are present. Preferably, the content in the mixture of very soft or soft particles which are capable of sliding is the same as or greater than the content of metals or alloys or/and carbon black. In addition, other types of particles, e.g. colourless pigments or coloured pigments or electrically conductive polymers, can also be present.

In contrast, the corrosion protection pigments, if present at all, can have a limited water-solubility or/and water-soluble contents. It is moreover preferable, especially in the presence of phosphide, for at least one inorganic or/and organic corrosion inhibitor also to be employed, but at least one corrosion protection pigment may also be sufficient for this purpose. A corrosion protection pigment based on phosphates, such as e.g. aluminium, alkaline earth metal or zinc phosphate, or/and based on alkaline earth metal carbonate, alkaline earth metal silicate or/and alkaline earth metal phosphosilicate is particularly preferred. A corrosion inhibitor based on amides, amines, butanoic acid derivatives, imides or/and imines is particularly preferred. The corrosion protection pigments and the corrosion inhibitors are known in principle.

In the mixture according to the invention, the mixture of all the types of corrosion protection particles can have, on addition to the mixture, a particle size transfer value $d_{99}$ in the range from 0.03 to 10 µm, preferably in a range up to 8 µm, particularly preferably in a range up to 6 µm, very particularly preferably in a range up to 5 µm and preferably in a range from at least 0.1 µm, particularly preferably in a range from at least 0.3 µm, very particularly preferably in a range from at least 0.5 µm. Furthermore, it is advantageous if the particle size transfer value $d_{99}$ of the corrosion protection particles is no greater than or not substantially greater than the particle size transfer value $d_{99}$ of the electrically conductive particles.

In the mixture according to the invention, the mixture of all the types of corrosion protection particles can have, on addition to the mixture, an average particle size $d_{50}$ in the range from 0.01 to 5 µm, preferably in a range up to 4 µm, particularly preferably in a range up to 3 µm, very particularly preferably in a range up to 2 µm and preferably in a range from at least 0.05 µm, particularly preferably in a range from at least 0.1 µm, very particularly preferably in a range from at least 0.3 µm. Furthermore, it is advantageous if the average particle size of all the types of corrosion protection particles is the same as or not substantially smaller than the average particle size of the electrically conductive particles. It is preferable to distribute the corrosion protection particles finely and homogeneously in the mixture and the coating formed therefrom. The corrosion protection particles can build up a barrier action for e.g. hydrogen ions and are consumed during corrosion no differently than sacrificing corrosion agents, such as e.g. metallic manganese or zinc. Platelets are the preferred particle shape of the corrosion protection pigment particles.

It is advantageous here if the sum of the weight contents of the water-insoluble or sparingly water-soluble pigmentation relative to the sum of the total pigmentation in the mixture is 30 to 99 wt. %. Preferably, it is 50 to 98 wt. %, particularly preferably at least 70 wt. % and up to 97 wt. %, very particularly preferably at least 90 wt. % and up to 96 wt. %.

A mixture in which the content of electrically conductive particles is 38 to 68 wt. %, the content of very soft or soft particles which are capable of sliding is 0.1 to 8 wt. % and the content of corrosion protection pigment is 1 to 15 wt. %, in each case based on the weight of the solid in the wet lacquer, is very particularly preferred. A mixture in which the content of electrically conductive particles is 44 to 62 wt. %, the content of very soft or soft particles which are capable of sliding is 0.5 to 5 wt. % or/and the content of corrosion protection pigment is 2 to 8 wt. %, in each case based on the weight of the solid in the wet lacquer, is particularly preferred.

The mixture according to the invention can preferably comprise, in addition to the inorganic particles, at least one resin and optionally at least one curing agent, at least one photoinitiator, at least one additive, water or/and an organic solvent. Preferably, the curing agent of at least one for thermal crosslinking, e.g. based on isocyanate(s), is added in an excess relative to the amount of binder of the mixture which is to be crosslinked with this. It is thereby possible for chemical reactions to be entered into between the curing agent and organic compounds of the coating underneath.

The solids contents of the liquid mixture remain practically identical from the wet lacquer via the dry film to the finished crosslinked coating produced therefrom. The solids contents of the mixture can therefore be regarded as the same as in the finished coating. If carbonate or similar substances with optionally volatile contents are to be used, this is to be taken into account accordingly.

In the mixture according to the invention, it may be advantageous if a content of organic lubricant, such as e.g. polyethylene wax, is added. Preferably, the mixture according to the invention will comprise not more than 0.5 wt. % of wax or/and of substances having wax-like properties, in particular not more than 0.2 wt. %, based on the dry weight of the wet lacquer, particularly preferably no wax and no substances having wax-like properties. At contents between 0.1 and 0.5 wt. %, these substances often already lead to an impairment of the adhesion or cohesion with subsequently applied coatings, such as e.g. further lacquer layers or adhesives, such as e.g. epoxy resin adhesives or adhesives of adhesive films. If gluing is not to be carried out, in particular, the content of organic lubricant can also be increased.

The object is moreover achieved by a process for producing a polymeric, corrosion-resistant, electrically conductive and electrically weldable coating, which can be shaped in a low-abrasive manner and comprises inorganic particles, on a substrate, which is characterized in that a mixture according to the invention is applied to an optionally precoated substrate, optionally dried and at least partly crosslinked.

Preferably, all the components of the mixture after drying, in the partly or/and completely cured state, are resistant to water and weak alkaline media.

The mixture according to the invention can be applied, in particular, by knife-coating, rolling, atomizing or/and spraying. Such an application is preferably carried out on a strip, which can be precoated. Spraying is particularly preferred for application to components or metal sheets. The application should be as uniform as possible and as far as possible of the same thickness.

The mixture can preferably be dried in the temperature range from 20 to 320° C., it also being possible to use drying in air at room temperatures or only slightly elevated temperatures. If crosslinking at relatively low temperatures ensures a binder mixture for a sufficiently chemically stable coating, stoving at usually a high temperature is not absolutely necessary. Stoving of a thermally crosslinking polymer system can preferably be carried out in the temperature range from 100 to 320° C. In the case of sensitive metallic materials, such as e.g. steels which are sensitive to bake-hardening, it may be preferable to carry out curing only or predominantly by means of free radicals or to carry out thermal curing preferably only at temperatures up to 160° C., in particular only up to 150° C. Thermal crosslinking can also be combined with crosslinking initiated by free radicals, which in particular helps to generate particularly high degrees of crosslinking in particular, thermal post-crosslinking after the crosslinking initiated by free radicals is advantageous here in order to achieve a particularly extensive crosslinking and particularly resistant coatings. It is moreover preferable if the degree of crosslinking of the polymeric matrix is at least 70%, preferably at least 80%, particularly preferably at least 90%. In the case of thermally curing polymer systems, the degree of crosslinking can in some cases also be adjusted via the stoving temperature and duration or/and via the content of catalysts. The heat can optionally also be introduced e.g. by NIR radiation (near infra-red). The types of crosslinking, their combination and the polymer systems on which they are based are adequately known to the expert.

In the process according to the invention, the very soft or soft particles which are capable of sliding, such as e.g. graphite, can in each case not be ground or subjected to only low-intensity grinding before the addition to the mixture or in the mixture or/and in a portion of the mixture, since it is advantageous if the particles of the graphite or/and the aggregates of many coherent or caked-together individual particles are more or less, largely or completely retained in their size, which is preferably significantly greater than that of the electrically conductive particles, and as far as possible only slightly lose in size for the intermixing. It is advantageous if these particles are also distributed as homogeneously as possible, in particular in the organic binder system. The mixture according to the invention can be applied to strips, metal sheets, parts and composite components of at least two parts, which are joined e.g. by clinching, gluing or/and welding. The mixture according to the invention can be applied, in particular, on fast-running belt installations, such as e.g. galvanizing installations or/and coil coating installations, on single rolled sheet installations and in parts production, in assembling or in the repair field.

In the process according to the invention, a coating having a thickness of less than 10 µm, in particular of less than 8 µm, preferably of less than 6 µm and particularly preferably of less than 4 µm can be produced.

In the process according to the invention, the mixture can be free or substantially free from organic lubricants, such as e.g. based on PTFE, silicone or/and oil, and free from inorganic or/and organic acids or/and heavy metals and other cations, such as e.g. arsenic, lead, cadmium, chromium, cobalt, copper or/and nickel. Above all, it is preferable that no chromium compound is added to the mixture according to the invention. Preferably, all or most of these substances are not intentionally added. Under certain circumstances, acids could increase the water uptake of the coating. Organic corrosion inhibitors should not be added in an overdose.

In the process according to the invention, the substrate can comprise at least one metal or/and at least one alloy and can optionally be precoated. In particular, it can substantially comprise a strip or sheet of aluminium, of an aluminium, iron or magnesium alloy or of steel, such as e.g. automobile steels.

In the process according to the invention, the mixture according to the invention can be applied directly to a pretreatment coating. The pretreatment coating of at least one in this context can be, in particular, one based on or having a content of in each case at least one phosphorus, silicon, titanium or/and zirconium compound, based on a complex fluoride compound, such as e.g. based on $TiF_6$, based on a phosphating coating, based on an alkaline passivation, such as having a content of at least one metal oxide, such as e.g. a passivation based on aluminium, iron, cobalt, manganese, nickel or/and zinc oxide, or/and based on a pretreatment coating comprising polymer, very fine particles and optionally on at least one compound of at least one IIIB/IVB element, such as e.g. La, Y, lanthanides, such as Ce etc., Ti, Zr, Hf or/and phosphate.

The object is furthermore achieved with an electrically conductive coating comprising polymers and inorganic particles which is produced with a mixture according to the invention or/and produced by the process according to the invention.

The coating according to the invention can be used as a welding primer, as a protective coating during shaping or/and joining, as corrosion protection of surfaces or in the edge, seam or/and welded seam region, as protection instead of a hollow cavity seal or/and a seam seal, in particular for vehicle construction or aircraft construction.

A measurement protocol, measured with a Mastersizer 2000 with a Hydro 2000S measuring head from Malvern Instruments, of the evaluation of a particle size distribution of electrically conductive particles in which the envelope curve was divided into Gauβ distribution curves is attached as FIG. 1. However, the main peak, which in this case is actually twin-peaked, is to be evaluated as a single peak according to the evaluation method chosen in this context, since the maxima of the Gauβ distribution curves on which it is based lie too close together.

It was surprising that it is essential that only a very limited but necessary small content of over-sized electrically conductive particles, which can project out of the cured polymeric coating like antennae, is capable of establishing the very small operating window of low abrasion, suitability for welding and corrosion resistance in a welding primer, since these properties partly conflict with each other.

In this fineness category, this content of over-sized particles can in some cases be determined only with the latest and best measurement technique, in order simultaneously to determine the finest and the largest particles as precisely as possible. By the fact that conventionally only particle count distributions are determined—and even worse, when the particle sizes are given only in linear form here—the over-sized particle contents are scarcely shown, if at all. Only in the particle volume distributions now chosen, in particular in a logarithmic plot, can the over-sized particle contents be analysed sensitively and clearly detected on the basis of the cubic relationship.

It was moreover surprising that it has proved to be particularly appropriate if the softer inorganic particles—because of even coarser over-sized particles than in the electrically conductive particles—overlap these and can protect them from abrasion in the event of mechanical attack. As a result and due to the limitation of the largest particles and the contents of over-sized particles, the welding primer coatings according to the invention of the 2nd generation can be made to be of very much lower abrasion.

It was moreover surprising that the over-sized soft particles, which are electrically semiconducting or/and rather electrically insulating, do not impair the suitability for welding, although they evidently partly overlap the surface of the electrically conductive particles.

It was furthermore surprising that it was possible to reduce the wear and the abrasion by up to about 95% for use in large presses with oiling or analogously in cup pressing, which is to be attributed to the oiling to only a minor degree.

In the case of the welding primer coatings of the 1st generation currently employed in practice, which have only a dry film thickness of about 3 μm of a mixture rich in zinc particles, the pressing tools already have to be cleaned after about 300 pressings because of the abrasion. With this relatively severe abrasion, the oil for the oiling is contaminated relatively severely, in particular with zinc. With the coatings according to the invention of the 2nd generation, the abrasion in the die of a large press is three to four times lower, since the pressing tools have to be cleaned only after about 900 to 1,200 pressings.

With the coatings according to the invention with a dry film thickness in the range from 5 to 6 μm, it was possible to maintain the suitability for welding in the same quality compared with the welding primer coatings of the 1st generation with a dry film thickness of approx. 3 μm, although significantly thicker, relatively more electrically insulating coatings comprising organic constituents are employed. The large volume of organic constituents is in conflict with the electrical conductivity of the coating. With the mixture according to the invention, it was possible to provide a sufficient number of paths of electrical conductivity through the coating.

In resistance spot welding, in each case two steel sheets 0.8 mm thick, which are each precoated on both sides with in each case a layer of electrolytic zinc and a pretreatment and provided with a coating according to the invention, are through-plated under standard conditions, so that in total 2 sheets with 12 individual layers in total are through-plated electrically. With the coatings according to the invention of the 2nd generation, it was possible, under these conditions, to set at least 1,000 welding points, in particular at least 1,100 welding points or at least 12 welding points under very difficult welding conditions, such as are currently conventional in the automobile sector, without replacing or reworking the welding electrodes and without troublesome smoke traces.

However, if metal sheets with coatings which smoke severely are employed for welding, under certain circumstances only 100 to 200 welding points can be achieved, it being necessary for the heavy smoke traces (trail formation) moreover to be removed laboriously, since they are otherwise still visible after the overlacquering, and the tendency to sputter increasing severely, this leading to deposits all over the surface which as far as possible also should be removed. However, these impurities cannot be removed by alkaline cleaning. In comparison with these coatings according to the invention, welding primer coatings of the 1st generation, if they were to have a dry film thickness in the range from 5 to 6 μm, would achieve fewer welding points by a factor of 2 to 3 than the coatings according to the invention of the 2nd generation at this dry film thickness.

Furthermore, the welding primer coatings according to the invention of the 2nd generation have, at a dry film thickness of 5 to 6 μm, about twice as high a corrosion resistance and about the same adhesive strength and gluing strength compared with the welding primer coatings of the 1st generation with a dry film thickness of approx. 3 μm, it being taken into account that thicker coatings typically have a lower adhesive strength and gluing strength than thinner coatings. However, the very high corrosion resistance of the welding primer coatings of the 2nd generation is only partly due to the higher layer thickness, since the material quality of the welding primer coatings according to the invention of the 2nd generation has also been increased considerably in respect of these properties.

In this context it has been possible for the first time for a steel sheet for use in the automobile industry and coated with a very thin pretreatment layer and a thin welding primer layer applied on to this on the one hand to be shaped without defects and pressed in a low-maintenance manner and without defects under the most severe conditions under series conditions in a sufficiently high piece number, and welded without defects and in a low-maintenance manner under the most severe conditions.

EXAMPLES AND COMPARISON EXAMPLES

The following examples (E) according to the invention and comparison examples (CE) which are reproduced in the tables explain preferred embodiments of the mixture, process and coating according to the invention and comparison tests.

The experiments for the examples according to the invention and for the comparison examples were largely carried out with the conventional raw materials, units and process steps in the lacquer industry, apart from individual grinding processes.

In the preparation of the mixtures, all the binders were initially introduced into the mixing vessel and diluted with the organic solvent or/and water, the additives and the corrosion protection pigments were then added and the mixture which existed was ground. Thereafter, the electrically conductive particles were ground separately from the remaining inorganic particles and the constituents were in each case added separately to the mixture and dispersed thoroughly with a dissolver. The particle size distribution of the remaining inorganic particles was adapted to the largest particles of the electrically conductive particles. Finally, the viscosity was adjusted to a suitable flow time with water and an organic solvent. This mixture was applied by means of a laboratory coater to electrolytically galvanized and subsequently pretreated steel sheets 0.8 mm thick. The sheets coated in this manner were dried at 80° C. and stoved at temperatures of about 220° C.

The tables show the diversity of differently ground and, where appropriate, specifically mixed grinding batches of the electrically conductive particles and the remaining inorganic particles in the same binder system and with same pigment types and contents. They furthermore show the properties of the coatings produced with the various mixtures.

The particle size distributions were measured with a Mastersizer 2000 with a Hydro 2000S measuring head from Malvern Instruments, a suspension being established by addition of a random sample of the particles to be measured to deionized water, this suspension additionally being dispersed by the action of ultrasound with the ultrasound source incorporated in the apparatus, initially at an intensity of approx. 80% for approx. 5 s and then at an intensity of approx. 30% for approx. 25 s. To establish the suspension and for the measurement, a pump setting of approx. 50% and a stirrer setting of approx. 40% were chosen, and the measurement was carried out in the "obscuration" setting (approx. 19%) and at increased sensitivity. The evaluation was performed using the Fraunhofer calculation model.

The mixture comprised the following, based on the total solids content:

48.10 wt. % iron phosphide,
20.40 wt. % zinc,
8.10 wt. % corrosion protection pigments,
2.05 wt. % graphite,
21.00 wt. % binder based on epoxy resins and isocyanates
0.35 wt. % water, including organic solvent.

Only the particle size distributions of the electrically conductive iron phosphide and of the remaining inorganic particles as a mixture of zinc, corrosion protection pigments and graphite were varied by grinding operations and, where appropriate, by mixing of individual grinding batches.

Furthermore, similar thermally curing binder systems and two binder systems which cure by means of free radicals with individual grinding batches, as shown in table 1, 2 and 4, of electrically conductive iron phosphide and of the remaining inorganic particles were prepared and investigated in several parallel experiments. No significant differences in weldability and only a slight tendency towards shifts in the mechanical and elastic properties of the coatings in the comparison of the properties of tables 1, 2, 4 and 5 resulted in these.

The experiments showed that optimization of the coating according to the invention between shapability, pressing capability, low abrasion during shaping, chemical stability, corrosion resistance and weldability during resistance spot welding is in no way easy. Surprisingly, the electrically conductive particles must be provided with a comparatively high volume content of over-sized particles which project out of the cured coating. However, this content should not be too high and the size of the over-sized particles should not be too large. In particular, it is to be ensured that above all with at least triple-peaked particle size distributions the coarsest particle content does not make up contents which are too high and particle sizes which are too large. It is advantageous here if in particular the softer particle contents are in the coarse particle range or/and their particle contents are higher than those of the electrically conductive particles.

Table 3 shows mixtures using tungsten powder. Tungsten typically showed an electrical resistance which—at a comparable purity—is of the order of size at least about 5% lower than that of zinc. The Mohs hardness was significantly more than 4. In examples 21 to 32, a tungsten particle grade of industrial purity which was ground down still further was used. It was found here that the tungsten powder could be ground very readily and felt very soft. It was found—against the expected properties—that the combination of tungsten powder with e.g. zinc powder or/and powder of an aluminium alloy or/and zinc alloy resulted in an unexpectedly high good suitability for welding and a good flexibility of the cured coating. A mixture with electrically conductive particles of zinc and tungsten in the weight ratio or about 1:1 to about 1:2 resulted here in a suitability for welding similar to, instead of this, iron phosphide alone. The ground tungsten powder added had a particle size distribution with an average particle size $d_{50}$ of 2.4 µm, with $d_{80}$ of 5.5 µm and with $d_{99}$ of 9.0 µm. The zinc powder added had a particle size distribution with an average particle size $d_{50}$ of 3.7 µm, with $d_{80}$ of 5.7 µm and with $d_{99}$ of 10.5 µm. The powder of the particularly corrosion-resistant magnesium-containing zinc alloy added had a particle size distribution with an average particle size $d_{50}$ of 4.2 µm, with $d_{80}$ of 5.6 µm and with $d_{99}$ of 9.2 µm. The powder of the corrosion-resistant aluminium alloy added had a particle size distribution with an average particle size $d_{50}$ of 3.9 µm, with $d_{80}$ of 5.6 µm and with $d_{99}$ of 10.2 µm. The iron phosphide powder added had a particle size distribution with an average particle size $d_{50}$ of 3.8 µm, with $d_{80}$ of 5.1 µm and with $d_{99}$ of 8.8 µm. Instead of the tungsten powder, it was also possible to employ powders of molybdenum, tantalum or/and niobium with similarly good success.

TABLE 1

Dry film thickness and particles properties of the examples according to the invention and of the comparison examples

| Examples, comparison examples | CE 1 | CE 2 | E 3 | E 4 | E 5 | E 6 | E 7 | E 8 | E 9 | E 10 | CE 11 | CE 12 |
|---|---|---|---|---|---|---|---|---|---|---|---|---|
| Average dry film thickness in μm | 5.0 | 5.0 | 5.0 | 5.0 | 5.0 | 5.0 | 5.0 | 5.0 | 5.0 | 5.0 | 5.0 | 5.0 |
| El. conductive particles: content > 5 μm in vol. % of the transfer curve | 1.5 | 2.0 | 5.0 | 7.5 | 12.5 | 15.0 | 17.5 | 19.0 | 21.0 | 22.0 | 35.0 | 38.0 |
| El. conductive particles: number of peaks | 1 | 1 | 1 | 1 | 2 | 2 | 2 | 2 | 2 | 3 | 3 | 4 |
| El. conductive particles: minimum at Y μm after the main peak | — | — | — | — | 5.6 | 6 | 6.8 | 7 | 7.2 | 7 | 7.5 | 8 |
| El. conductive particles: content > Y μm in vol. % of the transfer curve | — | — | — | — | 8.5 | 9 | 9.8 | 10.4 | 10.8 | 10.2 | 22.0 | 26.5 |
| El. conductive particles: $d_{98}$ in μm | 4.8 | 5.5 | 8.0 | 15.0 | 9.5 | 11.0 | 13.0 | 14.0 | 15.0 | 16.5 | 28.0 | 33.0 |
| Remaining particles: $d_{98}$ in μm | 9.0 | 9.0 | 9.0 | 19.0 | 13.0 | 13.0 | 19.0 | 19.0 | 19.0 | 19.0 | 19.0 | 19.0 |

TABLE 2

Properties of the cured coating of the examples according to the invention and of the comparison examples

| Examples, comparison examples | CE 1 | CE 2 | E 3 | E 4 | E 5 | E 6 | E 7 | E 8 | E 9 | E 10 | CE 11 | CE 12 |
|---|---|---|---|---|---|---|---|---|---|---|---|---|
| Electrical conductivity of the coating | low | low | high | very high | very high | very high | very high | very high | very high | very high | very high | very high |
| Elasticity of the coating in mm: cupping test acc. to DIN EN Iso 1520 | low | low | low | average | high | very high | very high | very high | very high | very high | very high | very high |
| Mechanical strength of the coating | very good | very good | very good | very good | very good | very good | very good | good | good | average | low | low |
| Defects after shaping | none | none | none | none | none | none | none | slight | slight | moderate | severe | severe |
| Defects on pressing | none | none | none | none | none | none | none | slight | slight | moderate | severe | severe |
| Tool wear on pressing | none | none | none | none | none | none | none | slight | slight | moderate | severe | severe |
| Suitability for spot welding | very poor | very poor | poor | moderate | good | very good | very good | very good | very good | very good | very good | very good |
| Surface sputtering | very severe | very severe | severe | moderate | slight | very slight | very slight | very slight | very slight | very slight | very slight | very slight |
| Smoke traces | very severe | very severe | severe | moderate | slight | none | none | none | none | none | none | none |
| Corrosion resistance | very good | very good | very good | very good | very good | very good | very good | very good | very good | very good | very good | very good |
| Adhesive strength | good | good | good to very good | good to very good | very good | very good | very good | excellent | excellent | excellent | excellent | excellent |

TABLE 3

Composition of the mixtures according to the invention with a content of tungsten powder

| Examples | E 21 | E 22 | E 23 | E 24 | E 25 | E 26 | E 27 | E 28 | E 29 | E 30 | E 31 | E 32 |
|---|---|---|---|---|---|---|---|---|---|---|---|---|
| *Thermal binders* | | | | | | | | | | | | |
| 1.a. Aqueous emulsion of an epoxy resin "type 7" (bisphenol A) | 6.50 | 6.50 | 6.50 | 6.50 | 6.50 | 6.50 | 6.50 | 6.50 | 6.50 | 6.50 | 6.50 | 6.50 |
| 1.b. Aqueous emulsion of a flexibilized epoxy resin "type 1" | 5.20 | 5.20 | 5.20 | 5.20 | 5.20 | 5.20 | 5.20 | 5.20 | 5.20 | 5.20 | 5.20 | 5.20 |
| 1.c. Aqueous emulsion of an HDI isocyanate, masked | 7.75 | 7.75 | 7.75 | 7.75 | 7.75 | 7.75 | 7.75 | 7.75 | 7.75 | 7.75 | 7.75 | 7.75 |
| *Additives* | | | | | | | | | | | | |
| 2.a. Polysiloxane | 0.20 | 0.20 | 0.20 | 0.20 | 0.20 | 0.20 | 0.20 | 0.20 | 0.20 | 0.20 | 0.20 | 0.20 |
| 2.b. 2-Amino-2-methyl-1 propanol | 0.25 | 0.25 | 0.25 | 0.25 | 0.25 | 0.25 | 0.25 | 0.25 | 0.25 | 0.25 | 0.25 | 0.25 |
| *Electrically conductive and semiconducting elements/alloys/compounds* | | | | | | | | | | | | |
| 3.a. Iron phosphide | — | — | — | — | — | — | 25.00 | 15.00 | 5.00 | — | — | — |
| 3.b. Tungsten | 30.00 | 22.50 | 15.00 | 12.00 | 8.00 | 5.00 | 7.36 | 11.54 | 13.47 | 15.00 | 15.00 | 15.00 |
| 3.c. Aluminium alloy | — | — | — | — | — | — | — | — | — | — | 17.05 | 34.10 |
| 3.d. Zinc | 19.10 | 26.60 | 34.10 | 37.10 | 41.10 | 44.10 | 16.74 | 22.56 | 30.63 | — | — | — |
| 3.e. Zinc alloy | — | — | — | — | — | — | — | — | — | 34.10 | 17.05 | — |
| *Corrosion protection pigments* | | | | | | | | | | | | |
| 4.a. Ca-modified silicate pigment | 5.00 | 5.00 | 5.00 | 5.00 | 5.00 | 5.00 | 5.00 | 5.00 | 5.00 | 5.00 | 5.00- | 5.00- |
| 4.b. Alkylammonium salt | 1.00 | 1.00 | 1.00 | 1.00 | 1.00 | 1.00 | 1.00 | 1.00 | 1.00 | 1.00 | 1.00 | 1.00 |
| *Solvent* | | | | | | | | | | | | |
| 5.a. Completely demineralized water | — | — | — | — | — | — | — | — | — | 5.00 | 5.00 | 5.00 |
| 5.b. Total content of org. solvent | 25.00 | 25.00 | 25.00 | 25.00 | 25.00 | 25.00 | 25.00 | 25.00 | 25.00 | 20.00 | 20.00 | 20.00 |

TABLE 4

Particle properties of the examples according to the invention according to dry film thickness

| Examples | E 11 | E 12 | E 6 | E 13 | E 14 |
|---|---|---|---|---|---|
| Average dry film thickness X in μm | 2.5 | 4.0 | 5.0 | 6.0 | 7.5 |
| E1. conductive particles: content > X μm in vol. % of the transfer curve | 12.0 | 20.5 | 15.0 | 10.5 | 7.0 |
| E1. conductive particles: number of peaks | 1 | 2 | 2 | 2 | 2 |
| E1. conductive particles: minimum at Y μm after the main peak | — | 6 | 6 | 6 | 6 |
| E1. conductive particles: content > Y μm in vol. % of the transfer curve | — | 9 | 9 | 9 | 9 |
| E1. conductive particles: $d_{98}$ in μm | 5.5 | 11.0 | 11.0 | 11.0 | 11.0 |
| Remaining particles: $d_{98}$ in μm | 7.5 | 13.0 | 13.0 | 13.0 | 13.0 |

TABLE 5

Properties of the cured coating of the examples according to the invention according to dry film thickness

| Examples | E4 | E5 | E6 | E7 | E8 |
|---|---|---|---|---|---|
| Electrical conductivity of the coating | very high | very high | very high | very high | very high |
| Elasticity of the coating in mm: cupping test acc. to DIN EN ISO 1520 | high | high | very high | very high | very high |
| Mechanical strength of the coating | very good | very good | very good | very good | very good |
| Defects after shaping | none | none | none | none | slight |
| Defects on pressing | none | none | none | none | slight |
| Tool wear on pressing | none | none | none | none | slight |
| Suitability for spot welding | very good | very good | very good | very good | very good |
| Number of welding points achieved without defects | 800 | 1,000 | 1,100 | 1,400 | 2,000 |
| Surface sputtering | very slight | very slight | very slight | very slight | very slight |
| Smoke traces | none | none | none | none | none |
| Corrosion resistance | very high | very high | very high | very high | very high |
| Adhesive strength | good | good | very good | very good | excellent |

An embodiment of the invention is directed to a coating having a dried film thickness of at least 4 μm and less than 10 μm. Another embodiment leads to an embodiment with an abrasion of less than 2 g per $m^2$ during shaping or pressing in a die of a large press.

The invention claimed is:
1. A process comprising:
applying a mixture comprising a resin and inorganic particles to a metallic substrate and drying to form a polymeric, corrosion-resistant, electrically conductive and electrically weldable dried coating;
wherein said inorganic particles comprise electrically conductive particles;
wherein the mixture comprises at least 10 wt. % of the electrically conductive particles having an electrical conductivity better than that of particles of pure zinc and having a Mohs hardness of greater than 4, based on a total solids contents of the mixture; and
wherein the electrically conductive particles have a particle size distribution;
wherein the transfer value $d_{99}$ relative to the transfer value $d_{10}$ in a volume plot has a factor of at most 10;
wherein 3 to 22 vol. % of the electrically conductive particles, in a measured volume plot are larger than the average layer thickness of the dried coating, determined on scanning electron microscopy photograph;
wherein the coating has a thickness of less than 10 μm;
wherein at least a portion of the electrically conductive particles project out of the polymeric coating; and
wherein at least a portion of the electrically conductive particles have a Mobs hardness of at least 5.5.
2. The process according to claim 1, wherein tire mixture comprises no electrically conductive particles having a particle size diameter greater than five limes the value of an average dry coating thickness of the dried and optionally also cured coating.
3. The process according claim 1, wherein the mixture comprises 20 to 80 wt. % of electrically conductive particles having an electrical conductivity better than that of particles of zinc and having a Mohs hardness of greater than 4, based on tire solids contents of the mixture.
4. The process according to claim 1, wherein the mixture comprises particles which slide or are a corrosion protection pigment.
5. The process according to claim 4, wherein the particles which slide are ground and mixed before addition to the mixture.
6. Tire process according to claim 1, wherein tire electrically conductive particles are selected from the group consisting of an alloy, a boride, a carbide, an oxide, a phosphide, a phosphate, a silicate and a silicide.
7. Tire process according to claim 1, wherein the mixture additionally comprises a curing agent, a photoinitiator, an additive, water, an organic solvent or 0.5 to 15 wt. % of a corrosion protection pigment.
8. The process according to claim 7, wherein the substrate comprises at least one of a metal or a metal alloy selected from the group consisting of aluminum, iron, magnesium alloy and steel.
9. The process according to claim 7, wherein the metallic substrate is treated with a pretreatment coating.
10. The process according to claim 1, wherein some of the electrically conductive particles are ground and mixed with the remaining electrically conductive particles.
11. The process according to claim 1, wherein a curing agent is added to the mixture.
12. The process according to claim 1, wherein the mixture, is at least one of irradiated with free radicals or heated in order to form a crosslinked, corrosion-resistant, viscoelastic coating.
13. The process according to claim 1, wherein the coating has a thickness of less than 8 μm, measured in the dry state on scanning electron microscopy photographs.
14. The process according to claim 1, wherein the mixture is free or substantially free from organic lubricants, acids or heavy metals.
15. A polymeric, electrically conductive and electrically weldable coating on a substrate, produced by the process according to claim 1.
16. A composition comprising steel and a coating produced according to the process of claim 1, wherein the coating is subjected to thermal curing at a temperature not above 160° C.
17. The process of claim 1, wherein the coating is crosslinked.
18. The process of claim 1, wherein the electroconductive particles are alloys of molybdenum, niobium, tantalum, tungsten or tin.
19. A process comprising:
applying a mixture comprising a resin and inorganic particles to a metallic substrate and drying to form a polymeric, corrosion-resistant, electrically conductive and electrically weldable dried coating;
wherein said inorganic particles comprise electrically conductive particles;
wherein the mixture comprises at least 10 wt. % of the electrically conductive particles, and the electrically conductive particles have an electrical conductivity better than that of particles of pure zinc and having a Mohs hardness of greater than 4, based on a solids contents of the mixture; and
wherein an envelope curve of a particle size distribution for the electrically conductive particles, in a measured logarithmic volume plot is at least twin-peaked and is divided into individual Gauss distribution curves;
wherein a first minimum of the individual Gauss distribution curves between a main peak and a next larger peak of these distribution curves, determined in μm, is greater by a factor of 0.9 to 1.8 than the average dry film thickness of the coating, determined on scanning electron microscopy photographs;
wherein not more than 22 vol. % of the particle size distribution of the electrically conductive particles is larger than the average dry film thickness;
wherein the coating has a thickness of less than 10 1μm;
wherein at least a portion of the electrically conductive particles project out of the polymeric coating; and
wherein at least a portion of the electrically conductive particles have a Mohs hardness of at least 5.5.
20. The process according to claim 19, wherein the mixture comprises no electrically conductive particles having a particle size diameter greater than five times the value of an average dry coating thickness of the coating.
21. The process according claim 19, wherein the mixture comprises 20 to 80 wt. % of electrically conductive particles having an electrical conductivity better than that of particles of zinc and having a Mohs hardness of greater than 4, based on the solids contents of the mixture.
22. The process according to claim 19, wherein the mixture additionally comprises particles which slide.
23. The process according to claim 19, wherein the electrically conductive particles are selected from the group consisting of an alloy, a boride, a carbide, an oxide, a phosphide, a phosphate, a silicate and a silicide.
24. The process according to claim 23, wherein the particles which slide are ground before addition to the mixture.
25. The process according to claim 24, wherein the substrate comprises aluminum, iron, magnesium alloy or steel.
26. The process according to claim 24, wherein the substrate is is coated with a pretreatment coating.

27. The process according in claim 23, wherein the mixture further comprises a curing agent, a photoinitiator, an additive, water, an organic solvent or 0.5 to 15 wt. % of corrosion protection pigment.

28. The process according to claim 19, wherein some of the electrically conductive particles are ground and mixed with the rest of of electrically conductive particles.

29. The process according to claim 19, wherein a curing agent is added to the mixture.

30. The process according to claim 19, wherein the mixture is irradiated with free radicals or heated in order to form a crosslinked, corrosion-resistant, viscoelastic coating.

31. The process according to claim 19, wherein the coating has a thickness of less than 8 μm, measured in the dry state on scanning electron microscopy photographs.

32. The process according to claim 19, wherein the mixture is free or substantially free from organic lubricants, acids, or heavy metals.

33. A polymeric, electrically conductive and electrically weldable coating on a substrate produced by the process of claim 19.

34. A composition comprising steel and the coating produced according to the process of claim 19, wherein the applied mixture is cured with thermal curing at a temperature not above 160° C.

35. The process of claim 19, wherein the coating is crosslinked.

36. The process of claim 19, wherein a substantial portion of the electroconductive particles are alloys of molybdenum, niobium, tantalum, tungsten or tin.

37. A coated substrate comprising a corrosion-resistant, electrically conductive and electrically weldable dried coating on a metallic strip or a metallic sheet, wherein the coating comprises a resin and inorganic particles, wherein the inorganic particles comprise electrically conductive particles, wherein the mixture comprises at least 10 wt. % of electrically conductive particles having an electrical conductivity better than that of particles of pure zinc and having a Mohs hardness of greater than 4, based on a solid contents of the mixture, wherein at least a portion of the electrically conductive particles have a Mohs hardness of at least 5.5, wherein the coating has an average dry film thickness of less than 10 microns, wherein electrically conductive particles project from the coating and, wherein the transfer value $d_{99}$ relative to the transfer value $d_{10}$ in a volume plot has a factor of at most 10.

38. A coated substrate comprising a substrate that is a metallic strip or a metallic sheet and a corrosion-resistant, electrically conductive and electrically weldable dried coating, wherein said coating comprises a resin and inorganic particles and has an average dry film thickness of at least 4 μm and less than 10 μm, wherein the inorganic particles comprise electrically conductive particles, wherein a mixture comprising at least 10 wt. % of electrically conductive particles is applied to the substrate and dried to form the coated substrate, wherein the electrically conductive particles have an electrical conductivity better than that of particles of pure zinc and having a Mobs hardness of greater than 4, based on the solids contents of the mixture, wherein at least a portion of the electrically conductive particles have a Mohs hardness of at least 5.5, and wherein electrically conductive particles project from the coating and, wherein the transfer value $d_{99}$ relative to the transfer value $d_{10}$ in a volume plot has a factor of at most 10.

39. A coated substrate comprising a substrate coated with a corrosion-resistant, electrically conductive and electrically weldable dried coating, where said coating comprises a resin and inorganic particles and has an average dry film thickness of at least 4 μm and less than 10 μm, wherein the substrate is a strip or a sheet of steel 0.8 mm thick and comprises at least one layer of zinc or of a zinc-containing alloy precoated thereon; wherein the inorganic particles comprise electrically conductive particles, wherein the coating is formed on the substrate by applying a mixture which comprises at least 10 wt. % of the electrically conductive particles, wherein the electrically conductive particles have an electrical conductivity better than that of particles of pure zinc and a Mohs hardness of greater than 4, based on the solids contents of the mixture, wherein at least a portion of the electrically conductive particles have a Mobs hardness of at least 5.5, wherein at least a portion of the electrically conductive particles project from the dried coating and wherein the transfer value $d_{99}$ relative to the transfer value $d_{10}$ in a volume plot has a factor of at most 10.

40. A coated substrate comprising a substrate coated with a corrosion-resistant, electrically conductive and electrically weldable dried coating, wherein the dried coating Comprises a resin and inorganic particles and have an average dry film thickness of less than 10 μm, wherein the substrate is a strip or a sheet of 0.8 mm thick of steel that is precoated on both sides thereof with at least one aver of zinc or of a zinc-containing alloy, wherein the inorganic particles comprise electrically conductive particles, wherein the dried coating is produced by applying a mixture which comprises at least 10 wt. % of the electrically conductive particles to the substrate and drying to form the dried coating, wherein the electrically conductive particles have an electrical conductivity better than that of particles of pure zinc and a Mohs hardness of greater than 4, based on the solids contents of the mixture, and wherein at least a portion of the electrically conductive particles have a Mobs hardness of at least 5.5, wherein electrically conductive particles project from the coating and wherein the transfer value $d_{99}$ relative to the transfer value $d_{99}$ in a volume plot has a factor of at most 10.

41. A process comprising producing a coated substrate comprising a metallic substrate coated with a dried corrosion-resistant, electrically conductive and electrically weldable coating, on a metallic substrate by:
applying a mixture comprising a resin and inorganic particles to the metallic substrate and drying to form a dried coating,
wherein the inorganic particles comprise electrically conductive particles,
wherein the mixture comprises at least 10 wt. % of the electrically conductive particles have an electrical conductivity better than that of particles of pure zinc and a Mohs hardness of greater than 4, based on a total solids contents of the mixture, and
wherein the electrically conductive particles have a particle size distribution;
wherein a transfer value $d_{99}$ relative to a transfer value $d_{10}$ in a volume plot has a factor of at most 10;
wherein 3 to 22 vol. % of the electrically conductive particles, in a measured volume plot are larger than the average layer thickness of the dried and optionally also cured coating, determined on scanning electron microscopy photograph;
wherein the dried coating has a thickness of less than 10 μm; and
wherein at least some of the electrically conductive particles project out of the polymeric coating.

* * * * *